US008662882B2

(12) United States Patent
Wang

(10) Patent No.: US 8,662,882 B2
(45) Date of Patent: Mar. 4, 2014

(54) GOLF BALL MOLD

(75) Inventor: Ying-Kai Wang, Chia-Yi Hsien (TW)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 13/436,153

(22) Filed: Mar. 30, 2012

(65) Prior Publication Data
US 2013/0259970 A1 Oct. 3, 2013

(51) Int. Cl.
B29C 45/22 (2006.01)
(52) U.S. Cl.
USPC .......................................... 425/573; 425/577
(58) Field of Classification Search
USPC .................................................. 425/573, 577
See application file for complete search history.

(56) References Cited

U.S. PATENT DOCUMENTS

| 2,076,412 | A | * | 11/1933 | Oldham | .................. | 425/573 |
|---|---|---|---|---|---|---|
| 5,122,046 | A | | 6/1992 | Lavallee et al. | | |
| 5,824,258 | A | | 10/1998 | Yamaguchi | | |
| 5,827,466 | A | | 10/1998 | Yamaguchi | | |
| 5,874,038 | A | * | 2/1999 | Kasashima et al. | ........... | 425/573 |
| 6,089,847 | A | * | 7/2000 | Inoue et al. | .................. | 425/573 |
| 6,168,407 | B1 | | 1/2001 | Kasashima et al. | | |
| 6,235,230 | B1 | * | 5/2001 | Puniello | ........................ | 425/577 |
| 6,413,464 | B1 | | 7/2002 | Tanaka | | |
| 6,561,782 | B1 | | 5/2003 | Umemoto | | |
| 7,520,824 | B2 | | 4/2009 | Kasashima | | |
| 7,718,107 | B2 | * | 5/2010 | Endo et al. | ..................... | 425/573 |
| 2001/0048180 | A1 | | 12/2001 | Cupples | | |
| 2010/0167846 | A1 | | 7/2010 | Hirau et al. | | |
| 2011/0130216 | A1 | | 6/2011 | Kim et al. | | |
| 2011/0160002 | A1 | | 6/2011 | Nakagawa et al. | | |

FOREIGN PATENT DOCUMENTS

JP 63141719 6/1988

* cited by examiner

Primary Examiner — Tim Heitbrink
(74) Attorney, Agent, or Firm — Plumsea Law Group, LLC

(57) ABSTRACT

The disclosure provides a golf ball mold that may produce a golf ball with a reduced gate defect. The golf ball mold may have a mold cavity having a mold chamber including a surface shaped as the inverse of a substantially hemispherical shape and a parting edge disposed along the perimeter of mold chamber. At least one gate may be disposed on the parting edge to provide a path for a cover material to be injected into the mold chamber. The gate may include a flat middle surface connected by a first side surface and a second side surface disposed opposite the first side surface. A round having a radius of curvature ranging from about 0.2 mm to about 0.5 mm may be disposed along a middle gate edge of middle surface and/or a side gate edge of one of the first side surface and the second side surface.

22 Claims, 7 Drawing Sheets

GOLF BALL MOLD

BACKGROUND

The present disclosure relates generally to an injection mold for injection molding an article. In particular, the disclosure relates to an injection mold for molding a golf ball.

The game of golf is an increasingly popular sport at both amateur and professional levels. A wide range of technologies related to the manufacture and design of golf balls are known in the art. For instance, a method of manufacturing golf balls involves injection molding layers of the golf ball. This method achieves a layer shaped like the mold. To inject material into the mold, the mold contains gates through which hot material flows. As the material cools, the material hardens inside the mold, as well as between the molds around the equator of the ball where the gates are located and inside the gates. As a result, the molded layer of the golf ball includes flash line around the equator of the ball and gate runners where the gates were located. To make the outer surface of the golf ball have a uniform finish, the flash line and gate runners are removed through grinding, buffing, and other processes. However, even after these removal processes, a gate mark is still visible where the gate runners were located. A gate mark defect rate may be determined by human or automated inspection of 100 or 1,000 golf balls. If there are more than 4 gate marks or there is 1 deep gate mark, both by a predetermined standard, then a ball is counted as a defective ball. It would be advantageous to be able to mold a golf ball with a reduced gate mark defects.

SUMMARY

A golf ball mold for molding a golf ball with a reduced gate mark defect is disclosed.

In one aspect, the disclosure provides a golf ball mold that may have at least one mold cavity. The mold cavity may have a mold chamber including a surface having a shape that is the inverse of a substantially hemispherical shape and a parting edge disposed along the perimeter of mold chamber. At least one gate may be disposed on the parting edge. The gate may provide a path for a cover material to be injected into the at least one mold chamber and may have at least one edge forming a first round between the at least one edge and the mold chamber. The first round may have a radius of curvature ranging from about 0.2 mm to about 0.5 mm. The at least one gate may include a flat middle surface connected by a first side surface and a second side surface disposed opposite the first side surface. The middle surface, first side surface, and second side surface may together form a substantially u-shaped cross-section. The cross-section of the at least one gate may include at least one fillet. The at least one fillet may include a radius of curvature ranging from about 0.2 mm to about 0.5 mm. The first round may be disposed along a middle gate edge of middle surface. The first round may be disposed along a side gate edge of one of the first side surface and the second side surface. The middle surface may include a middle gate edge. A second round may be disposed between the middle gate edge and the mold chamber. The second round may include a radius of curvature ranging from about 0.2 mm to about 0.5 mm. The first side surface and the second side surface may each have a height ranging from about 0.3 mm to about 1.0 mm. The first side surface may be about 1.0 mm to about 2.0 mm from the second side surface.

In one aspect, the disclosure provides a golf ball mold that may have first mold cavity. The first mold cavity may have a first mold chamber including a surface having a shape that is the inverse of a substantially hemispherical shape and a first parting edge disposed along the perimeter of the first mold chamber. The golf ball mold may have a second mold cavity having a second mold chamber including a surface having a shape that is the inverse of a substantially hemispherical shape and a second parting edge disposed along the perimeter of the second mold chamber. The second parting edge may have a shape corresponding to the first parting edge such that the first mold cavity may be mated with the second mold cavity. A first gate may be disposed on the first parting edge. A second gate may be disposed on the second parting edge. When the first parting edge mates with the second parting edge, the first gate may align with a portion of second parting edge to provide a first path for a cover material to be injected into the first mold chamber and the second mold chamber and the second gate may align with a portion of first parting edge to provide a second path for the cover material to be injected into the first mold chamber and the second mold chamber. The first path may have a substantially rectangular cross-section. The substantially rectangular cross-section may have a vertical height ranging from about 0.3 mm to about 1.5 mm. The second path may have a substantially rectangular cross-section. The first path may have a cross-sectional area ranging from about 0.3 mm² to about 2 mm². The first path may be offset from the second path.

In one aspect, the disclosure provides a golf ball mold that may have first mold cavity. The first mold cavity may have a first mold chamber including a surface having a shape that is the inverse of a substantially hemispherical shape and a first parting edge disposed along the perimeter of the first mold chamber. The first parting edge having a wavy surface. The golf ball mold may have a second mold cavity having a second mold chamber including a surface having a shape that is the inverse of a substantially hemispherical shape and a second parting edge disposed along the perimeter of the second mold chamber. The second parting edge may have a wavy surface corresponding to the wavy surface of the first parting edge such that the first mold cavity can mate with the second mold cavity. A first gate may be disposed on the first parting edge. A second gate may be disposed on the second parting edge. When the first parting edge mates with the second parting edge, the first gate may align with a portion of second parting edge to provide a first path for a cover material to be injected into the first mold chamber. The portion of the second parting edge that aligns with the first gate may be concave such that the portion of the second parting edge bows outwardly away from the first gate. When the first parting edge mates with the second parting edge, the second gate may align with a portion of first parting edge to provide a second path for the cover material to be injected into the first mold chamber and the second mold chamber. The portion of the first parting edge that aligns with the second gate may be concave such that the portion of the first parting edge bows outwardly away from the second gate. The first gate may have at least one edge forming a first round between the at least one edge and the first mold chamber. A vertical distance between a peak of the first parting edge and a peak of the second parting edge may range from about 0.5 mm to about 2.0 mm.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

An injection mold for injection molding an article is disclosed. In particular, the injection mold may be used to mold golf balls.

Golf balls typically include a core substantially surrounded by one or more layers. For example, a golf ball may be of a two-piece construction, having only a core and a cover layer, or a golf ball may have one or more intermediate layers located between the core and the cover layer. Golf balls within the scope of this disclosure may be of a two-piece construction, or may have additional intermediate layers between the core and cover layer. The disclosed mold may be used to form golf balls of all types.

Figure 1:
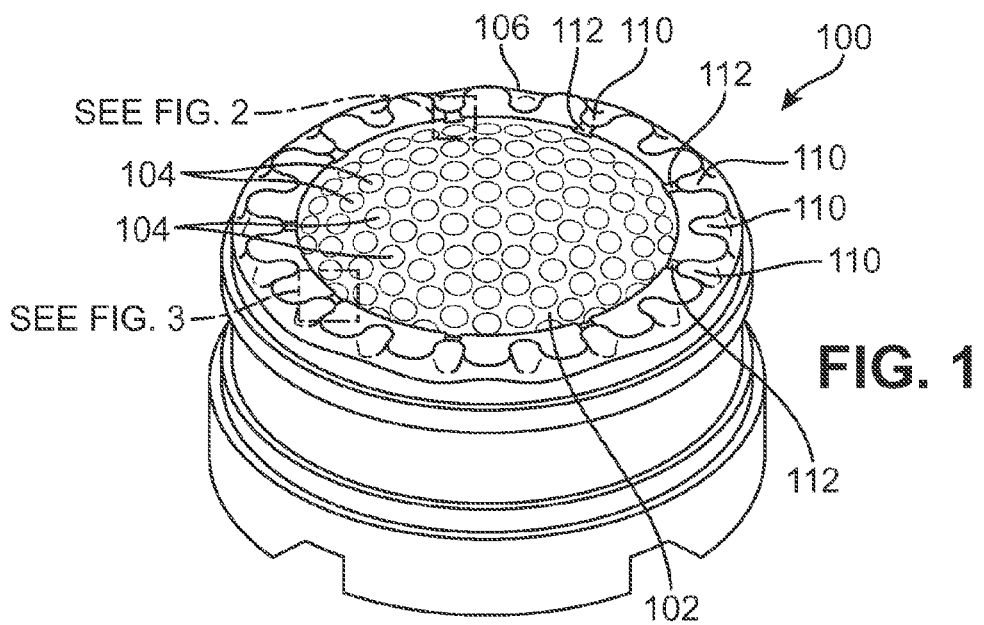
FIG. 1 is a perspective view of a golf ball mold cavity according to an embodiment.
Figure 3:
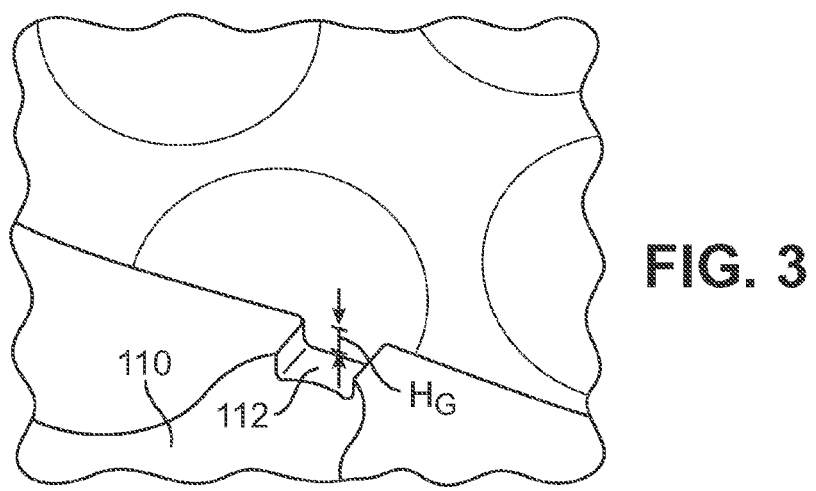
FIG. 3 is a zoomed in view of a portion of FIG. 1.
Figure 4:
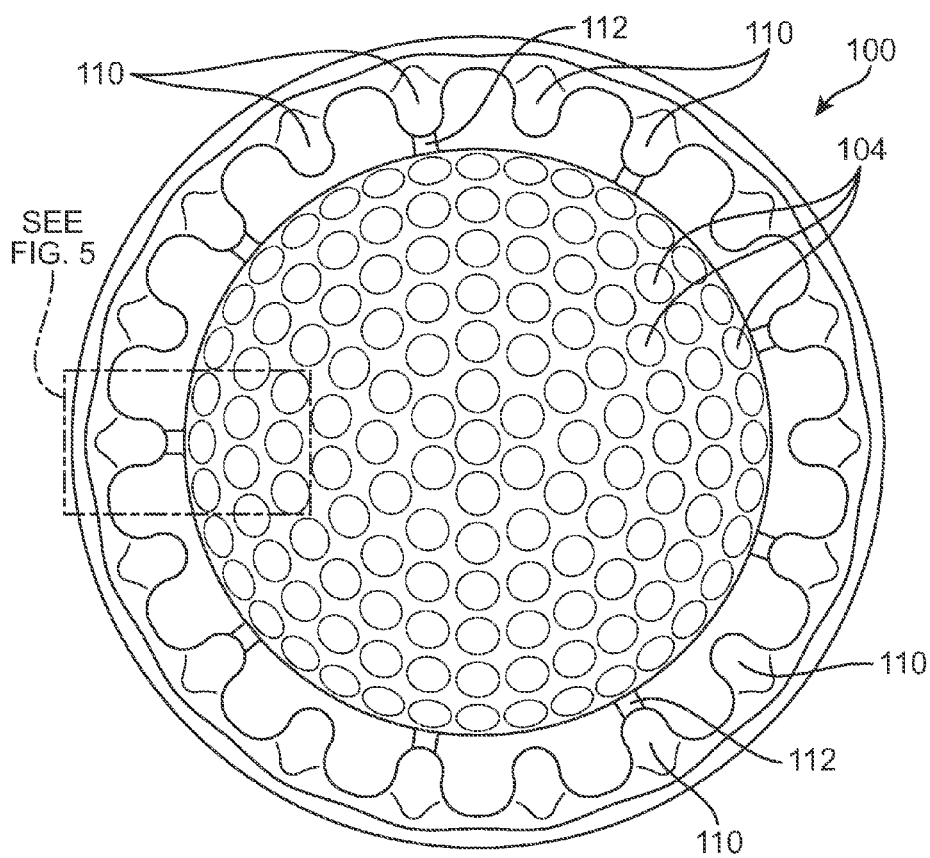
FIG. 4 is a top plan view of the golf ball mold cavity according to the embodiment shown in FIG. 1.

The cover layer of golf balls may be created by injection molding cover layer material around the core. The cover layer material may include a polymer, such as a thermoplastic, elastomeric, or thermosetting material. FIGS. 1-7 show a golf ball mold cavity 100 according to an embodiment. FIG. 1 is a perspective view of mold cavity 100 and FIG. 4 is a top plan view of mold cavity 100. Mold cavity 100 may have a mold chamber 102 and a parting edge 106. Mold chamber 102 may have an inverse hemispherical shape corresponding to the general shape of half of a golf ball. Multiple protrusions 104 may be dispersed about the surface of mold chamber 102. Protrusions 104 of mold chamber 102 may correspond to dimples formed on the cover layer of golf balls. The plurality of protrusions may generally be arranged so that the dimples form on the cover layer in any pattern, as may be known in the art of golf balls. Various known dimple packing patterns are known in the art. For example, golf ball dimple patterns generally may be based upon dividing the spherical surface of the ball into discrete polygonal surfaces. The edges of the surfaces may join to form geometric shapes that approximate the spherical surface of a golf ball. These geometric shapes may include, for example, regular octahedral, regular icosahedral and regular polyhedral arrangements. Once a geometric shape is selected, the polyhedral surfaces may be individually filled with a dimple pattern that may be repeated over the surface. Dimples may generally be of any shape, such as circular, triangular, or multi-sided. The size of the dimples may vary. In one embodiment, the dimple diameter is between about 1 mm to about 5 mm. The depth of the dimples may also vary based on desired flight performance. In one embodiment, the dimple depth is between about 0.1 mm to about 0.3 mm. Dimples may be of uniform shape and size, or the dimple pattern may be made up of two or more different types of dimples having, for example, different sizes or different shapes. In some embodiments, mold cavity 100 may include multiple mold chambers to mold multiple golf ball cover layers simultaneously.

Mold cavity 100 may have ports 110 disposed on parting edge 106 and gates 112 adjacent every other port 110 on parting edge 106. Gates 112 may be disposed between every other port 110 and mold chamber 102. Ports 110 and gates 112 may provide a fluid path from a source of cover layer material to mold chamber 102.

Figure 6:
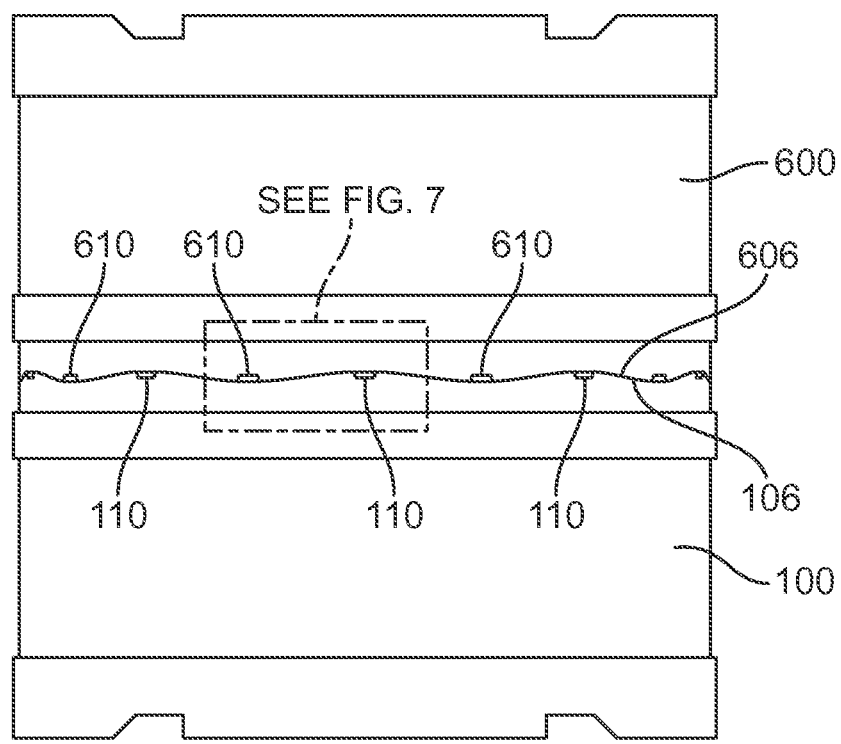
FIG. 6 is a side elevation view of the golf ball mold cavity according to the embodiment shown in FIG. 1 pressed together with a correspondingly shaped golf ball mold cavity.
Figure 7:
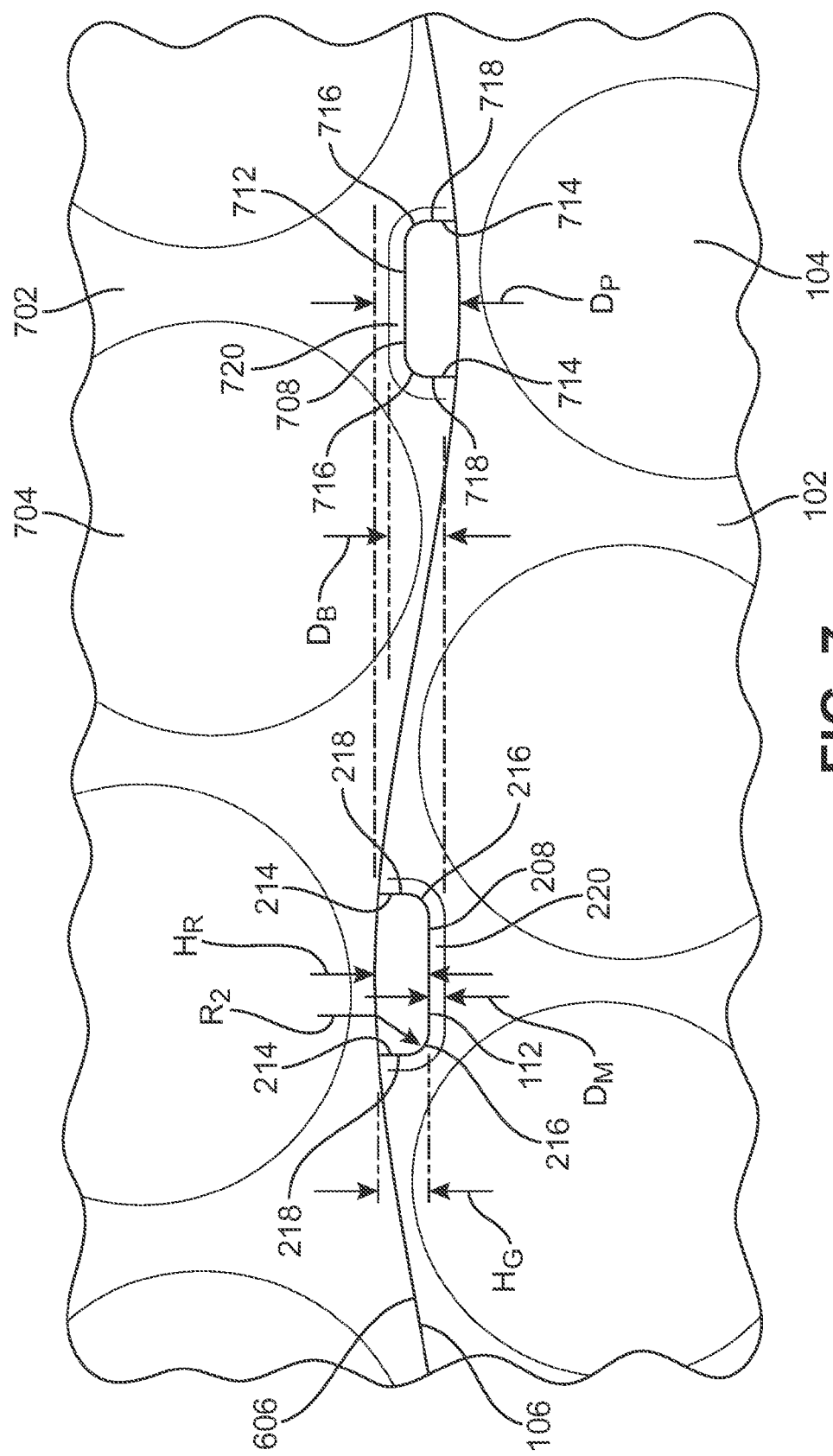
FIG. 7 is a zoomed in view of the inside of the mold cavities mated together as shown in FIG. 6.

In some embodiments, a golf ball cover layer may be formed by placing a golf ball core between multiple golf ball molds. For example, FIGS. 6 and 7 show how mold cavity 100 may be pressed together with a second mold cavity 600 shaped to compliment mold cavity 100. Together, mold cavity 100 and mold cavity 600 may constitute a golf ball mold. In some embodiments, the golf ball mold may include more than two cavities that together form a golf ball mold. For example, mold cavity 100 may be divided into two mold cavities and/or mold cavity 600 may be divided into two mold cavities. Thus, in such embodiments, the golf ball mold would be made up of three or four mold cavities. In some embodiments, a core may be placed between mold cavity 100 and mold cavity 600. Mold cavity 600 may have a mold chamber 702, parting edge 606, ports 610, and gates 712 corresponding to mold chamber 102, parting edge 106, ports 110, and gates 112, respectively. In embodiments where mold cavity 100 has multiple mold chambers, mold cavity 600 may have multiple corresponding mold chambers to mold multiple golf ball cover layers simultaneously. In embodiments where the golf ball mold is made up of more than two mold cavities, a core may be placed between the mold cavities such that the mold cavities can enclose the core.

Mold cavity 100 and mold cavity 600 may be pressed together to enclose the core within mold chambers. When mold cavity 100 is pressed together with mold cavity 600, the ports may be aligned such that ports 110 and ports 610 together form larger ports through which cover material may flow. FIG. 7 is a zoomed in view of the inside of the mold cavities mated together as shown in FIG. 6. FIG. 7 shows how gates 112 may align with a portion of parting edge 606 to form substantially rectangular openings. Similarly, gates 712 may align with a portion of parting edge 106 to form substantially rectangular openings. Each larger port may be in communication with a substantially rectangular opening such that fluid may flow from the larger port through the substantially rectangular opening into mold chamber 102. In some embodiments, retractable pins may be provided within the mold chambers to support the core so that a space may be maintained between the core and the inner walls of the mold chambers. Cover layer material may be injected into the spaces between one or more of ports 110 and ports 610. The cover layer material may flow from ports to the mold chambers via one or more of gates 112 and gates 712. The cover layer material may fill the space between the core and the mold chambers. As the material cools, it may set and form a cover layer around the core.

Figure 2:
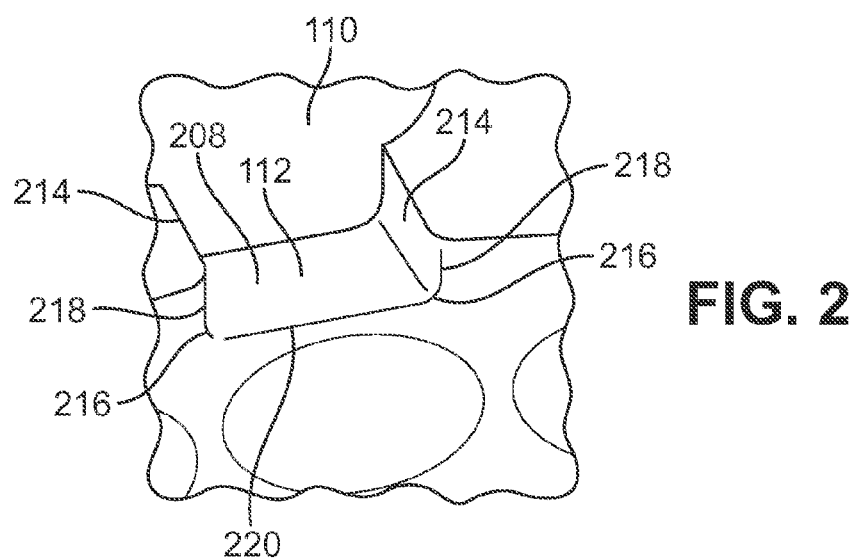
FIG. 2 is a zoomed in view of a portion of FIG. 1.
Figure 5:
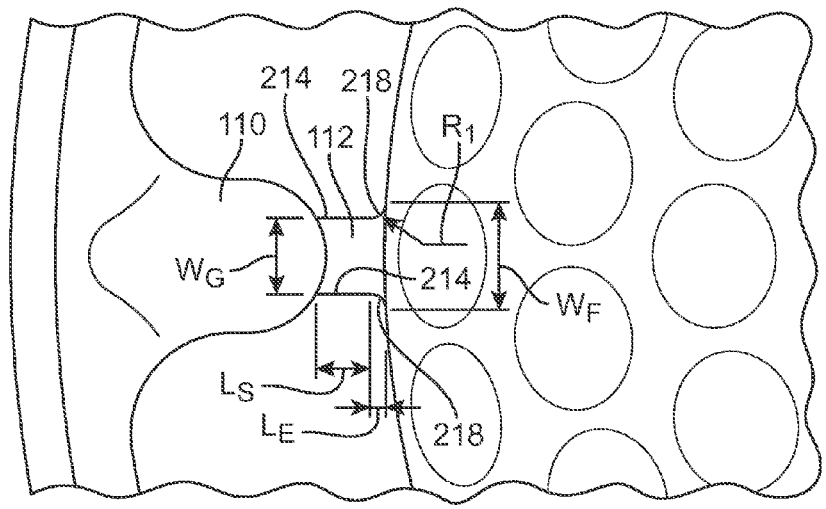
FIG. 5 is a zoomed in view of a portion of FIG. 4.

FIG. 2 is a zoomed in view of a portion of FIG. 1 including one of the gates. FIG. 3 is a zoomed in view of a portion of FIG. 1 including another one of the gates. FIG. 5 is a zoomed in view of a portion of FIG. 4 including one of the ports and one of the gates. In some embodiments, ports 110 may be defined as sunken areas of parting edge 106 that taper in width toward gates 112. The size and shape of ports 110 may be selected based on a variety of factors. For example, the size and shape of ports 110 may be selected based on the temperature of the mold cavities, the material used in the injection molding process, and/or the dimensions of gates 112. Ports 110 may be configured to direct material from the outer region of parting edge 106 to and through gates 112. In some embodiments, ports 610 may have a different size and/or shape than ports 110. In some embodiments, for example, as shown in FIGS. 6-7, ports 610 may have the same size and shape as ports 110.

Gates 112 may have a substantially u-shaped cross-section. In some embodiments, gates 112 may have two side surfaces 214 disposed opposite one another and a middle surface 208 disposed between two side surfaces 214. In some embodiments, middle surface 208 may connect side surfaces 214 at corners 216. In some embodiments, side surfaces 214 may be substantially flat. Middle surface 208 may be substantially flat. In some embodiments, side surfaces 214 may meet mold chamber 102 at side gate edges 218. Middle surface 208 may meet mold chamber 102 at middle gate edge 220. In some embodiments, side surfaces 214 and middle surface 208 may each include a round, or rounded exterior corner, where gates 112 meet mold chamber 102. For example, as shown in FIG. 5, side gate edges 218 may be rounded with a radius of curvature $R_1$ from about 0.2 mm to about 0.5 mm. In some embodiments, middle gate edge 220 may be rounded with a radius of curvature $R_1$ from about 0.2 mm to about 0.5 mm. As shown in FIG. 7, the vertical distance $D_M$ between middle surface 208 and the bottommost point of middle gate edge 220 may range from about 0.05 mm to about 0.5 mm. In some embodiments, corners 216 of gates 112 may be rounded to form a fillet, or a rounded interior corner. For example, as shown in FIG. 7, corners 216 may form a fillet with a radius of curvature $R_2$ from about 0.2 mm to about 0.5 mm. The rounding of the gate corners and/or edges may help disperse stress in the cover material already disposed in the mold during injection.

In some embodiments, as shown in FIG. 3, gates 112 may have a height $H_G$ that ranges from about 0.3 mm to about 1.0 mm. In some embodiments, as shown in FIG. 5, gates 112 may have a width $W_G$ along side surfaces 214. $W_G$ may range from about 1.0 mm to about 2.0 mm. In some embodiments, as shown in FIG. 5, the width of gates 112 may expand along gate edges 218 to a final width $W_F$ ranging from about 1.5 mm to about 2.5 mm. In some embodiments, as shown in FIG. 5, side surfaces 214 may have a length $L_S$ ranging from about 0.5 mm to about 1.5 mm. In some embodiments, as shown in FIG. 5, side gate edges 218 may have a length $L_E$ ranging from about 0.2 mm to about 0.5 mm. The entire length of gates 112 may include the sum of length $L_S$ and length $L_E$.

In some embodiments, the gates may have a different size and/or shape from gates 112. In some embodiments, for example, as shown in FIG. 7, gates 712 may have the same size and shape as gates 112. Gates 712 may have side surfaces 714 and a middle surface 708. Middle surface 708 may connect side surfaces 714 at corners 716. In some embodiments, side surfaces 714 may meet a mold chamber 702 of mold cavity 600 at side gate edges 718. Middle surface 708 may meet mold chamber 702 at middle gate edge 720.

The size and shape of gates 112 and/or gates 712 may be selected based on a variety of factors. For example, the size and shape of gates 112 and/or gates 712 may be selected based on the temperature of the mold cavities, the material used in the injection molding process, and/or the dimensions of the land areas disposed between protrusions 104. In some embodiments, gates 112 and/or gates 712 may be configured to lie flat on the land areas disposed between protrusions 104.

In some embodiments, gates 112 and/or 712 may have a substantially rectangular cross-section to provide a cross-section with a sufficient area for material to flow through while keeping the dimensions of the substantially rectangular cross-section small enough to fit on the land areas disposed between protrusions 104 and/or protrusions 704. For example, the height $H_G$ may be selected to be sufficiently small to fit between protrusions 104. To provide a cross-section having an area that is sufficiently large for efficient injection of material, width $W_G$ and width $W_F$ may be selected to be sufficiently large to compensate for a smaller height $H_G$. In some embodiments, the length of the gates may be selected to be sufficiently long for a trimming station to trim gate runners from golf balls after molding. In some embodiments, the length of the gates may be selected to be sufficiently short to prevent material from cooling and hardening too quickly.

In some embodiments, as shown in FIG. 7, parting edge 106 may have a wavy surface and parting edge 606 may have a surface with a corresponding shape such that the two parting edges may mate together. Each wave of first parting edge 106 and parting edge 606 may have a peak. As mentioned above, gates 112 may align with a portion of parting edge 606 to form substantially rectangular openings, or paths, and gates 712 may align with a portion of parting edge 106 to form substantially rectangular openings, or paths. As shown in FIG. 7, the portions of the parting edges that align with the gates may be concave such that the portions of the parting edges bow outwardly away from the gates. The substantially rectangular openings may have a height $H_R$ ranging from about 0.3 mm to about 1.5 mm or from 0.3 mm to 0.8 mm. The substantially rectangular openings may have a cross-sectional area ranging from about 0.3 mm² to about 2 mm². The wave of parting edge 106 and/or parting edge 606 may cause $H_R$ to be slightly larger than $H_G$. For example, in some embodiments, $H_R$ may be about 0.01 mm to about 0.5 mm larger than $H_G$. When mold cavity 100 and mold cavity 600 are placed together, as shown in FIGS. 6 and 7, gates 112 may face a first direction and gates 712 may face a second direction that is opposite the first direction. By having a first portion of the gates on one mold cavity and a second portion of the gates on another mold cavity, protrusions may be more closely spaced from one another near the parting edges. In other words, this configuration may provide more flexibility with designing protrusions.

The substantially rectangular openings formed by gates 112 may be vertically offset from the substantially rectangular openings formed by gates 712. The wave of parting edge 106 and/or parting edge 606 may cause this offset to be smaller than if the parting edges were completely flat. The size and shape of the wave may be selected based upon a variety of factors. For example, the size and shape of the wave may be selected based upon the size and/or shape of the gates, the size and/or shape of the mold chambers, and/or the size, shape, and/or position of the protrusions. In some embodiments, the size and/or shape of the wave may be selected to be sufficiently small such that flash lines created during the molding process are not difficult to remove. In some embodiments, the distance $D_B$ between the bottommost point of middle gate edge 220 and the bottommost point of middle gate edge 720 may range from about 0.1 mm to about 1.0 mm. In some embodiments, $H_R$ may be from about 0.01 mm to about 0.5 mm larger than the $D_B$. In some embodiments, the distance $D_P$ between a peak of parting edge 106 and a peak of parting edge 606 may range from about 0.5 mm to about 2.0 mm. In some embodiments, the distance $D_P$ between a peak of parting edge 106 and a peak of parting edge 606 may range from about 0.5 mm to about 1.0 mm. In some embodiments, $D_P$ may be from about 0.05 mm to about 0.5 mm larger than the sum of $D_M$ and $H_R$.

While FIGS. 1 and 4 show mold cavity 100 having 18 ports 110 and 9 gates 112, the number of ports and/or gates may vary. For example, mold cavity 100 may include from about 10 ports to about 24 ports and from about 5 gates to about 12 gates. The number of ports and/or gates may be selected based on a variety of factors. For example, the number of ports and/or gates may be selected based on the temperature of the mold cavities, the material used in the injection molding process, and/or the dimensions of the mold cavities. Increasing the number of gates may allow for the gates to have smaller cross-sectional dimensions, which may reduce the size of the gate runner left by material hardening in the gates during injection molding. Furthermore, reducing the size of the cross-sectional dimensions of the gates may create a higher pressure for injection of material through gates.

Table 1 shows the results of tests performed on test molds, which include example molds prepared according to the present disclosure and comparative examples of molds with different gate shapes and dimensions. The comparative examples include test results from molds made during development. The golf ball molds according to the present disclosure include Examples A and B, gate details of which are shown in Table 1. The comparative examples of molds with different gate shapes and dimensions include Comparative Examples C, D, E, and F, gate details of which are shown in Table 1. In Table 1, "Opening Shape" means the shape of the opening created by a gate and an edge aligned with the gate when the golf ball mold is assembled. In Table 1, "Opening Total Height" means the total height of the opening created by a gate and an edge aligned with the gate. The "Radius of the Round" means the radius of the round disposed along edges formed between the gates and the mold chambers of the molds. The molds were tested by using the molds to create a cover layer around cores or inner balls having a diameter of 40.5 mm. A cover material with the composition shown in Table 2 was injection-molded using a traditional injection machine with a temperature of about 215° C. to 230° C. The amounts of the materials are shown in Table 2 in parts by weight (pbw) or percentages by weight. PTMEG is polytetramethylene ether glycol, having a number average molecular weight of 2,000. PTMEG is commercially available from INVISTA, under the trade name of TERATHANE®. BG is 1,4-butanediol, commercially available from BASF Corporation and other suppliers. TMPMP is trimethylolpropane monoallyl ether, commercially available from Perstorp Specialty Chemicals AB. DCP is dicumyl peroxide. MDI is diphenylmethane diisocyanate, commercially available from Hunstman International LLC, under the trade name Suprasec® 1100. The cover material was formed by mixing PTMEG, BG, TMPME, DCP, and MDI in the proportions shown. Specifically, these materials were prepared by mixing the components in a high agitated stir for 1 minute, starting at a temperature of about 70° C., followed by a 10-hour post curing process at a temperature of about 100° C. The post cured polyurethane elastomers were ground into small chips.

For each mold, 1,000 balls were made. The defect rate of gate marks, listed in Table 1, was determined by human inspection of 1,000 golf balls. If there are more than 4 gate marks or there is 1 deep gate mark, both by a predetermined standard, then the ball is counted as a defective ball. As demonstrated by the test data, the molds prepared according to the present disclosure had lower gate mark defect rates than those of the comparative examples of molds.

TABLE 1

TEST DATA FOR GOLF BALL MOLDS

| Mold | Examples | | Comparative Examples | | | |
|---|---|---|---|---|---|---|
| | A | B | C | D | E | F |
| Gate number | 18 | 12 | 18 | 12 | 18 | 12 |
| Opening shape | Substantially Rectangular | Substantially Rectangular | Substantially Rectangular | Substantially Rectangular | Semicircular | Semicircular |
| Opening total height (mm) | 0.74 | 0.74 | 0.74 | 0.74 | 0.96 | 0.96 |
| Radius of round (mm) | 0.3 | 0.3 | 0.1 | 0.1 | 0.1 | 0.1 |
| Gate mark defect rate | 0.3% | 0.4% | 6% | 8% | 15% | 21% |

TABLE 2

COVER MATERIALS USED IN TESTING

| | A |
|---|---|
| PTMEG (pbw) | 100 |
| BG (pbw) | 15 |
| TMPME (weight % to total components) | 10% |
| DCP (weight % to total components) | 0.5% |
| MDI (pbw) | 87.8 |
| (NCO index) | 1.01 |

Figure 8:
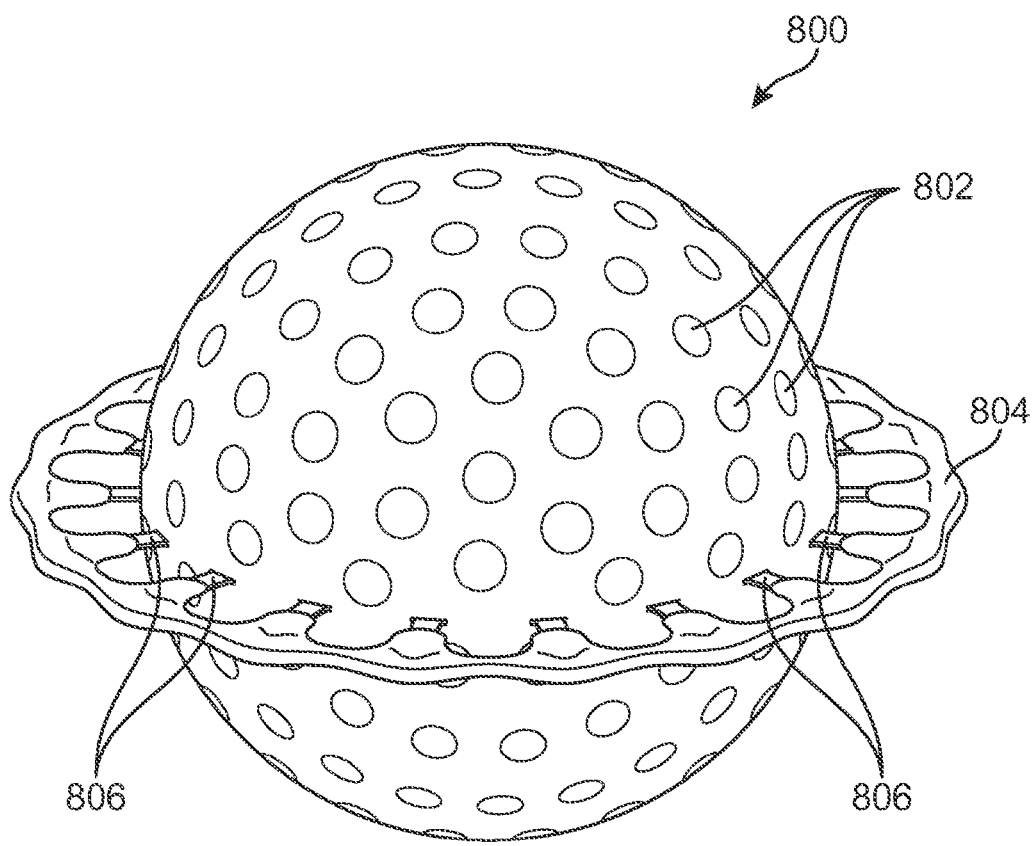
FIG. 8 is a perspective view of a golf ball according to an embodiment.

FIGS. 8-12 show an exemplary golf ball 800 as it appears after mold cavity 100 and mold cavity 600 are used to mold a cover layer around a core. FIG. 8 is a perspective view of a golf ball according to an embodiment. Dimples 802 on golf ball 800 may correspond with protrusions 104 of mold chamber 102 and protrusions 704 of mold chamber 702. Golf ball 800 may include a ring runner 804 and gate runners 806. Ring runner 804 may be formed when molten materials flow through runners to ports 110 and gates 112 during the molding process. Gate runners 806 may be a byproduct formed by gates 112 and gates 712 during the molding process. Gate runners 806 may have substantially the same size and shape as gates 112 and gates 712. In some embodiments, golf ball 800 may include a flash line (not shown) disposed about the equator of the ball where parting line 106 and parting line 606 met during molding.

After the cover layer is molded, to make the outer surface of the golf ball have a uniform finish, ring runner 804, gate runners 806, and the flash line may be removed through trimming, grinding, buffing, and/or other processes. Golf ball 800 may then undergo finishing work. For example, golf ball 800 may be sprayed with a protective coating or a coating that imparts aerodynamic properties to golf ball 800. These coating materials may be liquid when they are applied to the ball. Ball 800 may be stationary or may be spinning before, during, and/or after the coating material is applied to golf ball 800. Golf ball 800 may also undergo surface treatment and/or stamping process before the protective coating is applied to the ball surface.

Figure 9:
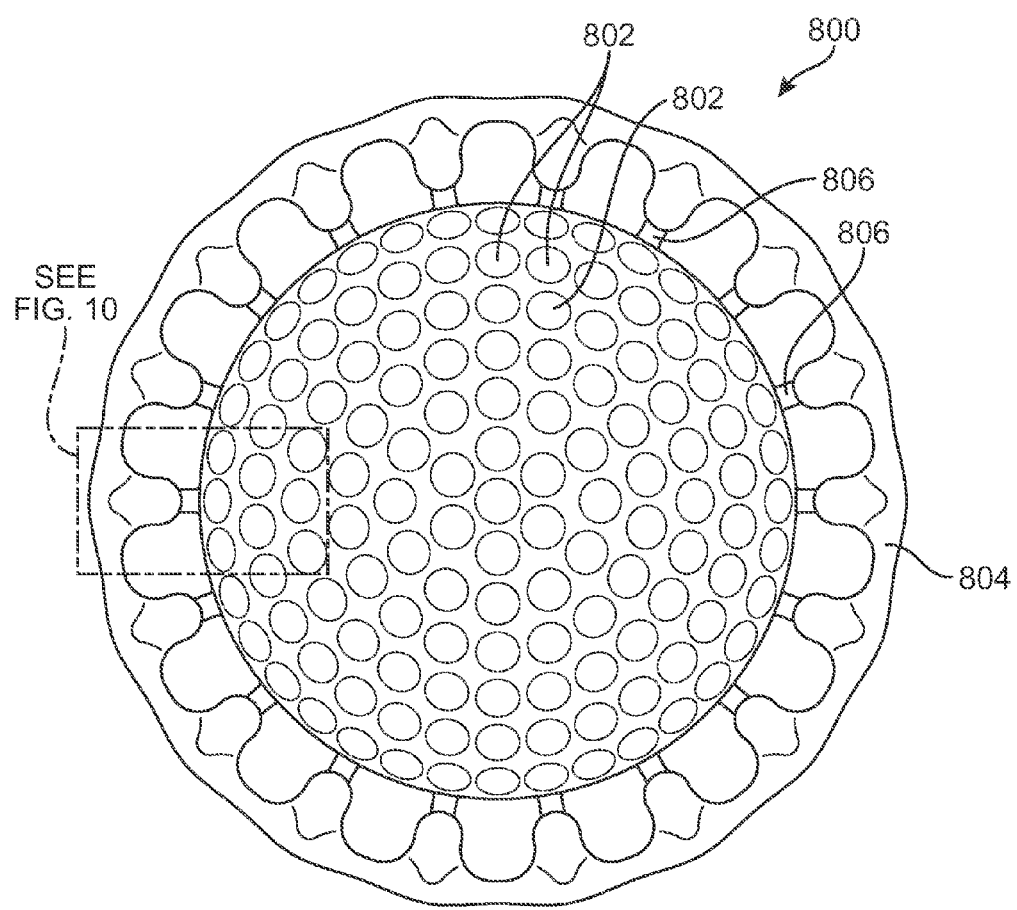
FIG. 9 is a top plan view of the golf ball according to the embodiment of FIG. 8.
Figure 10:
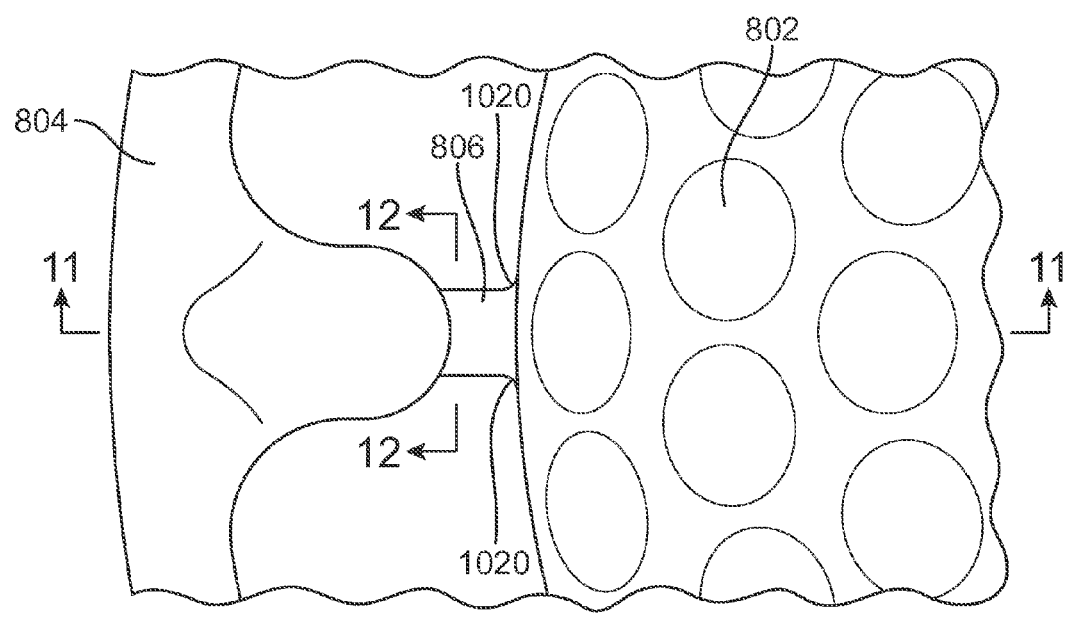
FIG. 10 is a zoomed in view of a portion of FIG. 9.
Figure 11:
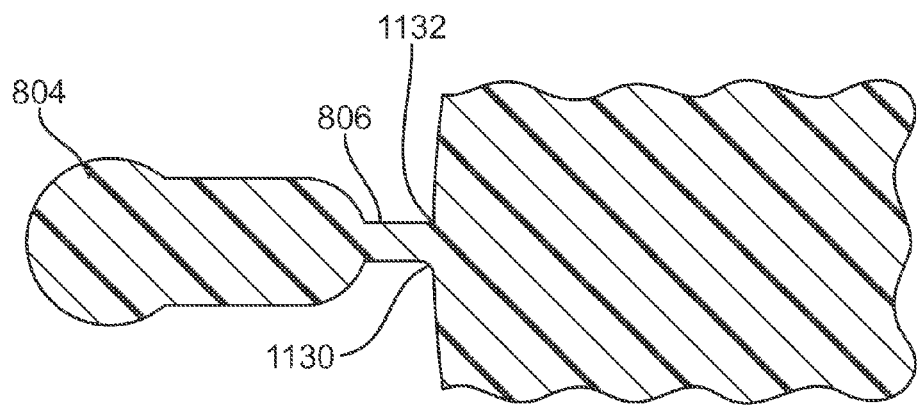
FIG. 11 is a cross sectional view of FIG. 10.

FIG. 9 is a top plan view of the golf ball according to the embodiment of FIG. 8. FIG. 10 is a zoomed in view of a portion of FIG. 9. Gate runners 806 may have rounded portions 1020 that form fillets where gate runners 806 meet golf ball 800. Rounded portions 1020 may be formed by side gate edges 218 during molding. FIG. 11 is a cross sectional view of FIG. 10. Gate runners 806 may have rounded portions 1130 that form fillets where gate runners 806 meet golf ball 800. Rounded portions 1130 may be formed by middle gate edge 218 during molding. Gate runners 806 may have an edge 1132 where gate runners 806 meet golf ball 800 on the side opposite rounded portions 1130. In some embodiments, the portions of parting edge 606 that are opposite gates 112 may be rounded adjacent mold chamber 602 in the same manner that middle gate edge 220 may be rounded. Similarly, the portions of parting edge 106 that are opposite gates 712 may be rounded adjacent mold chamber 102 in the same manner that middle gate edge 720 may be rounded. In such embodiments, edges 1132 may be rounded in the same manner as rounded portions 1130.

Figure 12:
FIG. 12 is a cross sectional view of FIG. 11.

FIG. 12 is a cross sectional view of FIG. 11. Gate runners 806 may include rounded portions 1240 forming rounds. Rounded portions 1020 may be formed by corners 216 of gates 112 and/or corners 716 of gates 712 during molding.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A golf ball mold comprising:
at least one mold cavity having a mold chamber including a surface having a shape that is the inverse of a substantially hemispherical shape and a parting edge disposed along the perimeter of mold chamber,
wherein at least one gate is disposed on the parting edge, the gate providing a path for a cover material to be injected into the at least one mold chamber, the at least one gate having at least one diverging edge forming a first round exterior corner leading to the mold chamber.

2. The golf ball mold according to claim 1, wherein the path has a substantially rectangular cross-sectional shape.

3. The golf ball mold according to claim 1, wherein the first round includes a radius of curvature ranging from about 0.2 mm to about 0.5 mm.

4. The golf ball mold according to claim 1, wherein the at least one gate includes a flat middle surface connected by a first side surface and a second side surface disposed opposite the first side surface, and wherein the middle surface, first side surface, and second side surface together form a substantially u-shaped cross-section.

5. The golf ball mold according to claim 4, wherein the cross-section of the at least one gate includes at least one fillet.

6. The golf ball mold according to claim 5, wherein the at least one fillet includes a radius of curvature ranging from about 0.2 mm to about 0.5 mm.

7. The golf ball mold according to claim 4, wherein the first round exterior corner is disposed along a middle gate edge of the middle surface.

8. The golf ball mold according to claim 4, wherein the first round exterior corner is disposed along a side gate edge of one of the first side surface and the second side surface.

9. The golf ball mold according to claim 8, wherein the middle surface includes a middle gate edge, wherein the middle gate edge comprises a diverging edge forming a second round exterior corner leading to the mold chamber and the second round exterior corner includes a radius of curvature ranging from about 0.2 mm to about 0.5 mm.

10. The golf ball mold according to claim 4, wherein the first side surface and the second side surface each have a height ranging from about 0.3 mm to about 1.0 mm.

11. The golf ball mold according to claim 4, wherein the first side surface is about 1.0 mm to about 2.0 mm from the second side surface.

12. A golf ball mold comprising:
a first mold cavity having a first mold chamber and a first parting edge disposed along the perimeter of the first mold chamber; and
a second mold cavity having a second mold chamber and a second parting edge disposed along the perimeter of the second mold chamber,
wherein the second parting edge has a shape corresponding to the first parting edge such that the first mold cavity may be mated with the second mold cavity,
wherein a first gate is disposed on the first parting edge, the first gate having at least one diverging edge forming a first round exterior corner leading to the mold cavity,
wherein a second gate is disposed on the second parting edge, the second gate having at least one diverging edge forming a second round exterior corner leading to the mold cavity, and
wherein when the first parting edge mates with the second parting edge, the first gate aligns with a portion of second parting edge to provide a first path for a cover material to be injected into the first mold chamber and the second mold chamber and the second gate aligns with a portion of first parting edge to provide a second path for the cover material to be injected into the first mold chamber and the second mold chamber.

13. The golf ball mold according to claim 12, wherein the first path has a substantially rectangular cross-section.

14. The golf ball mold according to claim 13, wherein the substantially rectangular cross-section has a vertical height ranging from about 0.3 mm to about 1.5 mm.

15. The golf ball mold according to claim 13, wherein the second path has a substantially rectangular cross-section.

16. The golf ball mold according to claim 13, wherein the first path has a cross-sectional area ranging from about 0.3 $mm^2$ to about 2 $mm^2$.

17. The golf ball mold according to claim 12, wherein the first path is vertically offset from the second path.

18. A golf ball mold comprising:
a first mold cavity having a first mold chamber including a surface having a shape that is the inverse of a substantially hemispherical shape and a first parting edge disposed along the perimeter of the first mold chamber, the first parting edge having a first wavy surface; and
a second mold cavity having a second mold chamber including a surface having a shape that is the inverse of a substantially hemispherical shape and a second parting edge disposed along the perimeter of the second mold chamber, wherein the second parting edge has a second wavy surface corresponding to the first wavy surface of the first parting edge, the first and second wavy surfaces forming a wavy parting edge such that the first mold cavity can mate with the second mold cavity;
wherein a first gate is disposed on a first side of the wavy parting edge, and
wherein a second gate is disposed on the second opposite side of the wavy parting edge.

19. The golf ball mold according to claim 18,
wherein when the first parting edge mates with the second parting edge, the first gate aligns with a portion of the second parting edge to provide a first path for a cover material to be injected into the first mold chamber, and
wherein the portion of the second parting edge that aligns with the first gate is concave such that the portion of the second parting edge bows outwardly away from the first gate.

20. The golf ball mold according to claim 19, wherein when the first parting edge mates with the second parting edge, the second gate aligns with a portion of the first parting edge to provide a second path for the cover material to be injected into the first mold chamber and the second mold chamber, and
wherein the portion of the first parting edge that aligns with the second gate is concave such that the portion of the first parting edge bows outwardly away from the second gate.

21. The golf ball mold according to claim 19, wherein the first gate has at least one diverging edge forming a first round exterior corner leading to the first mold chamber.

22. The golf ball mold according to claim 18, wherein a vertical distance between a peak of the first parting edge and a peak of the second parting edge ranges from about 0.5 mm to about 2.0 mm.

* * * * *